United States Patent
Bennetzen

(10) Patent No.: US 9,915,123 B2
(45) Date of Patent: Mar. 13, 2018

(54) CONFORMANCE CONTROL IN ENHANCED OIL RECOVERY

(71) Applicant: MAERSK OLIE OG GAS A/S, Copenhagen K (DK)

(72) Inventor: Martin Bennetzen, Doha (QA)

(73) Assignee: MAERSK OLIE OG GAS A/S, Copenhagen K (DK)

( * ) Notice: Subject to any disclaimer, the term of this patent is extended or adjusted under 35 U.S.C. 154(b) by 0 days.

(21) Appl. No.: 14/909,611

(22) PCT Filed: Jul. 31, 2014

(86) PCT No.: PCT/EP2014/066501
§ 371 (c)(1),
(2) Date: Feb. 2, 2016

(87) PCT Pub. No.: WO2015/014939
PCT Pub. Date: Feb. 5, 2015

(65) Prior Publication Data
US 2016/0186041 A1    Jun. 30, 2016

(30) Foreign Application Priority Data

Aug. 2, 2013 (GB) .................... 1313897.9

(51) Int. Cl.
| | | |
|---|---|---|
| *E21B 33/138* | (2006.01) |
| *E21B 43/20* | (2006.01) |
| *C09K 8/58* | (2006.01) |
| *C09K 8/588* | (2006.01) |
| *E21B 47/06* | (2012.01) |

(52) U.S. Cl.
CPC .............. *E21B 33/138* (2013.01); *C09K 8/58* (2013.01); *C09K 8/588* (2013.01); *E21B 43/20* (2013.01); *E21B 47/06* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,318,815 A | | 3/1982 | Tyler |
| 4,941,533 A | * | 7/1990 | Buller .................... C09K 8/594 166/246 |
| 4,974,677 A | * | 12/1990 | Shu ........................ C09K 8/512 166/270 |
| 5,763,588 A | | 6/1998 | Matteucci et al. |
| 6,702,023 B1 | * | 3/2004 | Harris ...................... C09K 8/52 166/300 |

(Continued)

OTHER PUBLICATIONS

GB Search Report dated Jan. 22, 2014 for corresponding United Kingdom Application No. 1313897.9.

(Continued)

*Primary Examiner* — Anuradha Ahuja
(74) *Attorney, Agent, or Firm* — Harness, Dickey & Pierce, P.L.C.

(57) ABSTRACT

A method of enhancing oil recovery by use of conformance control involves the provision of a plugging material which is designed to be formed within an area of high-permeability in preference to an area of low permeability in order that subsequent water, gas or chemical flooding can enhance oil recovery from the area/region of low permeability.

22 Claims, 1 Drawing Sheet

(56) References Cited

U.S. PATENT DOCUMENTS

Figure 1:
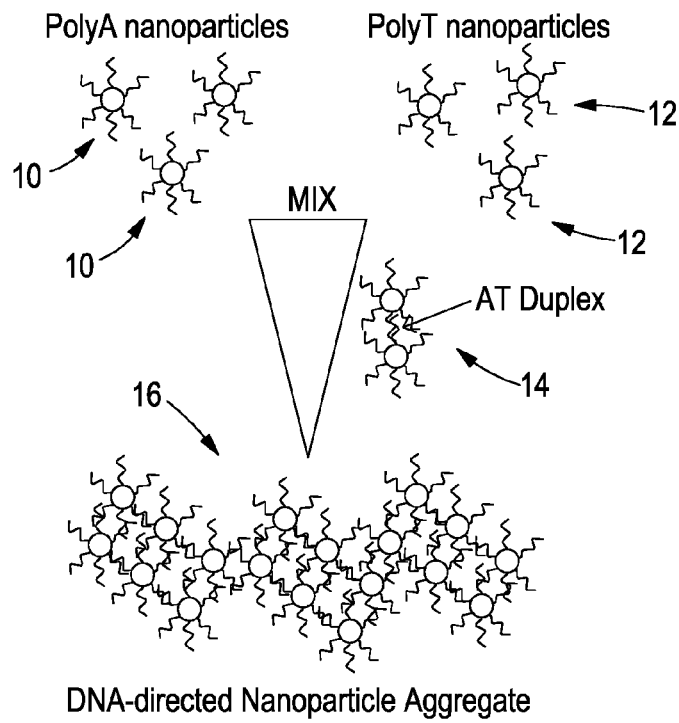

| | | | | |
|---|---|---|---|---|
| 7,323,336 B2* | 1/2008 | Callen | ...................... | C12P 19/14 |
| | | | | 435/183 |
| 2001/0045279 A1* | 11/2001 | Converse | ................. | C09K 8/58 |
| | | | | 166/246 |
| 2004/0244969 A1* | 12/2004 | Kotlar | .................... | C07K 14/00 |
| | | | | 166/246 |
| 2006/0258542 A1* | 11/2006 | Segura | ................ | C08B 37/0087 |
| | | | | 507/209 |
| 2007/0032386 A1* | 2/2007 | Abad | ..................... | C09K 8/508 |
| | | | | 507/201 |
| 2007/0249504 A1 | 10/2007 | Ballard | | |
| 2009/0075845 A1* | 3/2009 | Abad | ....................... | C09K 8/12 |
| | | | | 507/117 |
| 2009/0082227 A1* | 3/2009 | Hnatow | .................. | C02F 3/344 |
| | | | | 507/201 |
| 2010/0044031 A1* | 2/2010 | Fallon | .................... | C09K 8/582 |
| | | | | 166/246 |
| 2010/0136682 A1 | 6/2010 | Mirkin et al. | | |
| 2010/0212888 A1* | 8/2010 | Hendrickson | .......... | C09K 8/582 |
| | | | | 166/246 |
| 2010/0252267 A1* | 10/2010 | Harris | ..................... | C09K 8/52 |
| | | | | 166/307 |

OTHER PUBLICATIONS

International Search Report and Written Opinion dated Oct. 1, 2014 for corresponding International Application No. PCT/EP2014/0665001.

Denmark Examination Report dated Jun. 16, 2015 for corresponding PA Application No. 2015 70163.

* cited by examiner

CONFORMANCE CONTROL IN ENHANCED OIL RECOVERY

CROSS-REFERENCE TO RELATED APPLICATIONS

This is a National Phase of PCT Patent Application No. PCT/EP2014/066501, filed on Jul. 31, 2014, which claims priority under 35 U.S.C. § 119 to Great Britain Patent Application No. 1313897.9, filed on Aug. 2, 2013, the contents of each of which are hereby incorporated by reference in their entirety.

FIELD OF THE INVENTION

The present invention relates to an improved method of enhancing oil recovery by use of conformance control. More particularly, the method of conformance control involves the provision of a plugging material which is designed to be formed within an area of high-permeability in preference to an area of low permeability in order that subsequent water, gas or chemical flooding can enhance oil recovery from the area/region of low permeability.

BACKGROUND TO THE INVENTION

Water flooding as an oil recovery technique has been in use since 1890 when operators in the US realised that water entering the productive reservoir formation was stimulating production. In some cases, water is supplied from an adjacent connected aquifer to push the oil towards the producing wells. In situations where there is no aquifer support, water must be pumped into the reservoir through dedicated injection wells. The water phase replaces the oil and gas in the reservoir and thereby serves to maintain pressure. Recovery factors from water flooding vary from 1-2% in heavy oil reservoirs up to 50% in light oil reservoirs with typically values around 30-35%, much lower than the microscopic sweep efficiency of 70-80%.

The reason for sub-optimal recovery factors is related to the macroscopic sweep, which in turn is a reflection of reservoir heterogeneity and fluid mobility ratios. Fluid mobility ratio may be controlled to some extent by adding viscosifying agents to the injection phase, such as polymers or foams, but the presence of large permeability variations requires a different approach to improve macroscopic sweep. An extreme case is a direct high-permeability conduit, either natural or induced, between an injector and one or more producers, which requires complete or at least partial plugging. This process is known as conformance control.

Conformance control generally requires a combination of mechanical and chemical solutions. The role of the mechanical part is to ensure that the chemicals reach the part of the reservoir, which they are intended to plug. Although commercial chemicals already exist for plugging high-permeability zones, the chemical mixture has to be tailored to a particular application, depending on salinity, temperature, pore size etc. The main challenge lies in conveying the chemicals to the right place in the reservoir. Failure to achieve proper delivery may result in plugging of the near well-bore, with reduced production or injection as a result.

Zhu et al. (Journal of Canadian Petroleum Technology, 1993, 32/9, p 37-43 teaches a salting-out concept in which a non-electrolyte (alcohol) is added to water to reduce the solubility of electrolytes (salt). A preflush of highly salt-concentrated brine was followed by a flush with ethanol. The brine and ethanol both flow through the water flooded high-permeability zones and will mix there. The ethanol leads to the salt precipitating, which serves to plug these high-permeability zones. In homogenous and heterogeneous sandpacks the reduction of brine permeability was 70% and 50%, respectively, leading to an incremental oil recovery of 15% of oil initially in place (after water flooding). However, there is a concern that the ethanol and brine may mix not only in the desired permeability zone, leading to salt precipitation in an incorrect location. Moreover, the ethanol may mix with other salt bearing solutions which may lead to salt precipitation again occurring in an incorrect location.

It is amongst the objects of the present invention to obviate and/or mitigate at least on of the aforementioned disadvantages.

SUMMARY OF THE INVENTION

The present invention is based on a method of conformance control which employs nucleic acid which is capable of forming a complex in order to provide a plug in permeable oil bearing subterranean areas. Typically the plug may be formed in regions of high permeability, so as to facilitate oil recovery from areas of lower permeability.

In a first aspect, the present invention provides a method of selectively reducing the permeability of a first region of subterranean formation, the method comprising providing first and second conformance controlling fluids to the first region, wherein the first conformance controlling fluid comprises a first nucleic acid molecule and the second conformance controlling fluid comprises a second nucleic acid, and wherein said first and second nucleic acid molecules are capable of hybridising or otherwise binding to one another under appropriate conditions such that a nucleic acid complex is formed reducing the permeability in at least a portion of the first region.

The method may further comprise providing a displacement or flood fluid to the formation after the complex has been formed, whereby the flood fluid is directed to regions of the formation in which a reduction in permeability has not occurred through complex formation.

In a preferred embodiment flow of the displacement/flood fluid through the first region of the permeable formation is reduced, the flood fluid is preferentially directed to flow through a second region of reduced permeability relative the first region of permeable substrate. As an example, the method of reducing permeability may reduce flow of a flood fluid through an area of "high" permeability, in order to enhance or increase flood fluid flow through one or more areas of "low" or reduced permeability in comparison to the area of "high" permeability. Although the terms "high" and "low" are relative terms, their meaning will be clearly understood in the context of the present invention to relate to areas of a permeable substrate which are understood to display a relative increased and decreased flow of the flood fluid prior to the method of the present invention being carried out. In this manner oil recovery from the area of low or lower permeability may be enhanced.

Conveniently, the first and second conformance controlling fluids are provided to the permeable formation separately, such that the first and second conformance fluids only contact one another once within the first permeable region. For example, the first and second conformance controlling fluids may be provided so as to flow into the first region from separate first and second locations adjacent to the first permeable region. For example the first and second conformance controlling fluids may be provided from first and second wellbores situated on either side or adjacent to the first area of permeability. In this manner, it is expected that the first and second conformance controlling fluids will only come into substantial contact once within the first area of the permeable substrate.

Advantageously, the first location and the second location may be different. By such provision, in use, the first fluid may preferentially enter and/or may be preferentially directed into the first region from the first location, and the second composition may preferentially enter and/or may be preferentially directed into the first region from the second location. As a result, the first fluid and the second fluid may contact within the first permeable region in order to form the complex within the first region. The low permeability of the second region may not permit a substantial amount of the first fluid and/or of the second fluid to enter and/or to be directed into the second region.

As a result, the present method may reduce, minimise and/or prevent contact between the first fluid and the second fluid in the second region. Thus, the present method may advantageously assist in at least partially plugging and/or reducing permeability of the first region (e.g. region of high permeability), while reducing, minimising and/or preventing plugging in the second region (e.g. region of low permeability). By such provision, the recovery factor during subsequent oil recovery, e.g. by flooding, may be increased as the displacement substance, e.g. flood fluid, may be forced to displace hydrocarbons in the second region of low permeability. In addition, injecting the first fluid and the second fluid from different locations, e.g. respectively from at least one first or production wellbore and from at least one second or injection wellbore, may reduce the amount of reaction product in the first and/or in the second wellbores, thereby reducing the risk of accidentally plugging the first and/or second wellbores.

The first and second locations may be located on substantially opposite sides of the formation and/or first region thereof. It will be appreciated that the precise disposition to the first and second locations may be selected depending on the particular profile and/or characteristics of the formation.

The first location may comprise and/or may be defined by one of more first wellbores. One or more first wellbores may typically comprise one or more production wellbores or injection wellbores, typically one or more production wellbores.

The second location may comprise and/or may be defined by one of more second wellbores. One or more second first well bores may typically comprise one or more injection wellbores or production wellbores, typically one or more injection wellbores.

Advantageously, the first fluid may be injected from at least one production wellbore or injection wellbore. The second fluid may be injected from the other of at least one injection wellbore or production wellbore. By such provision, the first and second fluids may be provided to the first region separately, such that the first and second fluids may preferentially contact one another and/or the first and second nucleic acids to bind/hybridise within the first region of permeability.

By providing the first and second conformance controlling fluids to separate locations, such as two separate wells adjacent to the permeable substrate, the formation of the nucleic acid complex, except in the desired location, is avoided and/or reduced. Moreover, by providing the first and second conformance controlling fluids separately, e.g. from separate locations, it is expected that the ability of the first and second conformance controlling fluids from coming into contact within said second region(s) of reduced permeability is significantly reduced in comparison to the first region of high or enhanced permeability. These features are not expected to be achieved with plugging methods of the prior art which use a single conformance controlling fluid and/or a single well or source of fluid provision to the permeable formation.

As will be described in more detail, the first and second nucleic acid molecules are designed so as to be able to bind or hybridise to one another within the first region of the permeable substrate. Desirably, the first and second nucleic acid molecules are designed to bind strongly to one another under conditions (such as an appropriate pressure and/or temperature) which are expected in the first area of permeability. Binding/hybridisation of the two nucleic acid molecules may be encouraged/enhanced through the use of salt. It is well known to the skilled addressee that the stability of hybridised nucleic acid molecules is increased with increasing salt concentrations. Thus, it may be preferred to provide a salt in an amount of between, 0.001-2M such as 0.01 to 0.3M in the first region of permeability to enhance and/or stabilise binding/hybridisation of the first and second nucleic acid molecules. The salt may be provided separately to the first and second conformance controlling fluids and/or may be present in one or both of the first and second conformance controlling fluids.

Moreover, it is also possible to make the formation of the complex more permanent by introducing a suitable cross-linking agent. Suitable nucleic acid cross-linking agents include alkylating agents, such as 1,3-bis(2-chloroethyl)-1-nitrosourea (BCNU) and aldehydes such as acrolein and crotonaldehyde.

Also, if the complex forms in a region where is not desired, or it is simply desired to removed a non-cross linked complex from a region, this may be achieved by introducing a hydrogen bond denaturant. This may be desirable should a complex form in a region of low permeability. Thus, in certain embodiments, a denaturing agent, such as urea or formamide and/or increasing pH through use of an appropriate base, such as NaOH typically in solution may be provided to a region of low permeability in order to reduce any complexes formed therein.

It may also be desirable to encourage mixing of the first and second conformance controlling fluids and this may be achieved by ensuring that the first and second conformance controlling fluids are of different viscosities.

The first fluid may have a viscosity greater than the viscosity of the second fluid, e.g. water, for example by a factor of approximately 2-20, e.g. 2-10, e.g. 5-10. By such provision, injection of the second fluid may displace at least a portion of a displacement substance, e.g. water, present in the first region, out of the first region, for example into a portion of the second region near or adjacent the first region, in preference to displacing the more viscous first. Advantageously, this may assist in promoting mixing of the first fluid and second fluid within the first region, for example by creating "viscous fingering" of the second fluid through the more viscous first fluid.

The method may comprise maintaining the first wellbore and/or the second wellbore, typically both the first wellbore and the second wellbore, in a closed configuration, for a predetermined amount of time. The amount of time may be selected to allow reaction between the first composition and the second composition to occur. It will be appreciated that the amount of time may depend on the conditions expected in the first region, such as temperature, pressure, pore size, reservoir properties, etc.

In an embodiment, the method may comprise injecting the first fluid and the second fluid simultaneously. By simultaneously, it is meant that the first fluid and the second fluid may be injected substantially at the same time, although the first location and second location may be different.

In another embodiment, the method may comprise injecting the first fluid and the second fluid alternatively. Advantageously, this may permit filling and/or saturation of the first region with the first fluid, before injection of the second fluid. In such an embodiment it may not be necessary to employ first and second wellbores and the first and second fluids may be provided from a single wellbore at different times.

The method may comprise measuring and/or monitoring pressure, e.g. bottom-hole pressure (BHP), in the first location or first wellbore and/or in the second location or second wellbore, advantageously both in the first wellbore and in the second wellbore. A sharp increase in BHP in the first location, e.g. production wellbore, may indicate that injection of the first fluid should be ceased. Without wishing to be bound by theory, it is believed that such an increase in BHP in the first location may indicate that the first fluid has substantially filled or saturated the first region (e.g. of high permeability), and is about to enter the second region (e.g. of low permeability).

Typically, the method may comprise injecting the displacement substance from at least one wellbore, e.g. injection wellbore. The method may comprise recovering oil from at least one wellbore, e.g. production wellbore. Advantageously, because the permeability of the first region has been reduced by formation of the complex in the first region of permeability, the recovery factor may be increased.

In one embodiment, the present invention provides nucleic add functionalised nanoparticles for use in a method as defined herein. The nanoparticles comprise a nucleic add molecule attached, conjugated or otherwise bound to the surface of the nanoparticle. In accordance with the invention, first and second nucleic acid functionalised nanoparticles are provided which are intended to hybridise or otherwise bind to one another, such as through complementary base pairing of the two different nucleic add molecules to one another. Binding of the two nucleic add molecules to one another, for example complementary or substantially complementary nucleic add molecules, leads to formation of a complex, which comprises nanoparticles in combination with hybridised nucleic add molecules. Many such complexes are able to form where the respective first and second nucleic acid functionalised nanoparticles come into contact and hybridise, leading to the formation of a plug, blockage or the like forming in the area of complex formation.

A number of abbreviations and definitions are used throughout the specification and may be used for the interpretation of the invention.

It is noted here that, as used in this specification, the singular forms "a," "an," and the include plural reference unless the context clearly dictates otherwise.

It is to be noted that the terms "nucleic add", "polynucleotide" and "oligonucleotide" are used interchangeably herein and have meanings accepted in the art.

It is further noted that the terms "attached", "conjugated", "bound" "modified" and "functionalised" are also used interchangeably herein and refer to the association of a nucleic acid molecule with a moiety, such as a nanoparticle.

As used herein, a "nucleic add" is a polymer of RNA or DNA that is single-stranded, optionally containing synthetic, non-natural or altered nucleotide bases. An isolated nucleic add in the form of a polymer of DNA may be comprised of one or more segments of cDNA, genomic DNA or synthetic DNA. The nucleic add may be provided by recombinant expression of the nucleic acid or by de novo polynucleotide synthesis techniques well known to those skilled in the art.

The term "nucleotide" or its plural as used herein is interchangeable with modified forms as discussed herein and otherwise known in the art. In certain instances, the art uses the term "nucleobase" which embraces naturally-occurring nucleotide, and non-naturally-occurring nucleotides which include modified nucleotides. Thus, nucleotide or nucleobase means the naturally occurring nucleobases adenine (A), guanine (G), cytosine (C), thymine (T) and uracil (U). Non-naturally occurring nucleobases include, for example and without limitations, xanthine, diaminopurine, 8-oxo-N6-methyladenine, 7-deazaxanthine, 7-deazaguanine, N4,N4-ethanocytosin, N',N'-ethano-2,6-diaminopurine, 5-methylcytosine (mC), 5-($C_3$-$C_6$)-alkynyl-cytosine, 5-fluorouracil, 5-bromouracil, pseudoisocytosine, 2-hydroxy-5-methyl-4-triazolopyridin, isocytosine, isoguanine, inosine and the "non-naturally occurring" nucleobases described in Benner et al., U.S. Pat. No. 5,432,272 and Susan M. Freier and Kari-Heinz Altmann, 1997, Nucleic Acids Research, vol. 25: pp 4429-4443. The term "nucleobase" also includes not only the known purine and pyrimidine heterocycles, but also heterocyclic analogues and tautomers thereof. Further naturally and non-naturally occurring nucleobases include those disclosed in U.S. Pat. No. 3,687,808 (Merigan, et al.), in Chapter 15 by Sanghvi, in Antisense Research and Application, Ed. S. T. Crooke and B. Lebleu, CRC Press, 1993, in Englisch at al., 1991, Angewandte Chemie, International Edition, 30: 613-722 (see especially pages 622 and 623, and in the Concise Encyclopedia of Polymer Science and Engineering, J. I. Kroschwitz Ed., John Wiley & Sons, 1990, pages 858-859, Cook, Anti-Cancer Drug Design 1991, 6, 585-607, each of which are hereby incorporated by reference in their entirety). In various aspects, polynucleotides also include one or more "nucleosidic bases" or "base units" which are a category of non-naturally-occurring nucleotides that include compounds such as heterocyclic compounds that can serve like nucleobases, including certain "universal bases" that are not nucleosidic bases in the most classical sense but serve as nucleosidic bases. Universal bases include 3-nitropyrrole, optionally substituted indoles (e.g., 5-nitroindole), and optionally substituted hypoxanthine. Other desirable universal bases include, pyrrole, diazole or triazole derivatives, including those universal bases known in the art. Modified nucleotides are described in EP 1 072 679 and WO 97/12896, the disclosures of which are incorporated herein by reference. Modified nucleobases include without limitation, 5-methylcytosine (5-me-C), 5-hydroxymethyl cytosine, xanthine, hypoxanthine, 2-amino-adenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine and other alkynyl derivatives of pyrimidine bases, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 2-F-adenine, 2-amino-adenine, 8-azaguanine and 8-azaadenine, 7-deazaguanine and 7-deazaadenine and 3-deazaguanine and 3-deazaadenine. Further modified bases include tricyclic pyrimidines such as phenoxazine cytidine(IH-pyrimido[5,4-b][1,4]benzoxazin-2(3H)-one), phenothiazine cytidine (IH-pyrimido[5,4-b][1,4]benzothiazin-2(3H)-one), G-clamps such as a substituted phenoxazine cytidine (e.g. 9-(2-aminoethoxy)-H-pyrimido[5,4-b]f I,4Jbenzox-azin-2(3H)-one), carbazole cytidine (2H-pyrimido[4,5-b]indol-2-one), pyridoindole cytidine (H-pyrido[3',2':4,5Jpyrrolo[2,3-d]pyrimidin-2-one). Modified bases may also include those in which the purine or pyrimidine base is replaced with other heterocycles, for example 7-deaza-adenine, 7-deazaguanosine, 2-aminopyridine and 2-pyridone. Additional nucleobases include those disclosed in U.S. Pat. No. 3,687,808, those disclosed in The Concise Encyclopedia Of Polymer Science And Engineering, pages 858-859, Kroschwitz, J. L, ed. John Wiley & Sons, 1990, those disclosed by Englisch et al. 1991, Angewandte Chemie, International Edition, 30: 613, and those disclosed by Sanghvi, Y. S., Chapter 15, Antisense Research and Applications, pages 289-302, Crooke, S. T. and Lebleu, B., ed., CRC Press, 1993. Certain of these bases are useful for increasing the binding affinity and include 5-substituted pyrimidines, 6-azapyrimidines and N-2, N-6 and O-6 substituted purines, including 2-aminopropyladenine, 5-propynyluracil and 5-propynylcytosine. 5-methylcytosine substitutions have been shown to increase nucleic acid duplex stability by 0.6-1.2° C. and are, in certain aspects combined with 2'-O-methoxyethyl sugar modifications. See, U.S. Pat. No. 3,687,808, U.S. Pat. Nos. 4,845,205; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121; 5,596,091; 5,614,617; 5,645,985; 5,830,653; 5,763,588; 6,005,096; 5,750,692 and 5,681,941, the disclosures of which are incorporated herein by reference.

Methods of making polynucleotides of a predetermined sequence are well-known. See, e.g., Sambrook et al, Molecular Cloning: A Laboratory Manual (2nd ed. 1989) and F. Eckstein (ed.) Oligonucleotides and Analogues, 1st Ed. (Oxford University Press, New York, 1991). Solid-phase synthesis methods are well known for both polyribonucleotides and polydeoxyribonucleotides (the well-known methods of synthesizing DNA are also useful for synthesizing RNA). Polyribonucleotides can also be prepared enzymatically. Non-naturally occurring nucleobases can be incorporated into the polynucleotide, as well. See, e.g., U.S. Pat. No. 7,223,833; Katz, J. Am. Chem. Soc, 74:2238 (1951); Yamane, et al, J. Am. Chem. Soc, 83:2599 (1961); Kosturko, et al., Biochemistry, 13:3949 (1974); Thomas, J. Am. Chem. Soc, 76:6032 (1954); Zhang, at al, J. Am. Chem. Soc, 127:74-75 (2005); and Zimmermann, at al, J. Am. Chem. Soc, 124:13684-13685 (2002).

"Hybridisation" or "binding" refers to an interaction between two or three strands of nucleic acids by hydrogen bonds in accordance with the rules of Watson-Crick DNA complementarity, Hoogstein binding, or other sequence-specific binding known in the art. Hybridisation, or binding of nucleic acids to one another in the context of the present invention can be performed under suitable salt conditions, temperatures and pressures as can be provided in a particular environmental location, most typically oil bearing permeable substrates.

"Complex" as used herein refers to a structure which forms when the nucleic acid molecules, such as nucleic add functionalised nanoparticles of the present invention, bind to or hybridise to one another. Typically a complex will comprise many, such as 10 s, or 100 s or more nucleic acid molecules.

"Nanoparticles" are herein defined as metallic, metal salt, semiconductor or any other type of particle with an average particle diameter of for example between 1 and 800 nm. Metallic nanoparticles include, but are not limited to, particles of gold, silver, platinum, palladium, iridium, rhodium, osmium, iron, copper, cobalt, and alloys composed of these metals. "Metal salt or semiconductor nanoparticles" include, but are not limited to particles of cadmium selenide, cadmium sulfide, silver sulfide, cadmium sulfide, zinc sulfide, zinc selenide, lead sulfide, gallium arsenide, silicon, tin oxide, iron oxide, and indium phosphide. Nanoparticles may also be made from organic material and/or polymeric material, such as dextran, polyethylene glycol and the like.

Preferably, the average particle diameter of the particles is between about 10 and 500 nm. As used herein, "particle size" and "particle diameter" have the same meaning. The nanoparticles may be substantially spherical in shape or may form another type of nano-structure.

The term "nano-structure" means tubes, rods, cylinders, bundles, wafers, disks, sheets, plates, planes, cones, slivers, granules, ellipsoids, wedges, polymeric fibres, natural fibres, and other such objects which may have at least one characteristic dimension less than about 100 or 50 nm.

The nanoparticles of the invention may be coated. The coating can serve as an attachment for the nucleic acid or a spacer or binding moiety, and may also serve to render the nanoparticle water soluble. Methods for the preparation of, water-soluble nanoparticles are known in the art. These particles can be either charged or neutral depending on the nature of the organic coating. For example, Templeton et al. (Langmuir 15:66-76 (1999)), herein incorporated by reference, describe a method for the preparation of stabilized, charged, water-soluble gold nanoparticles protected by tiopronin or coenzyme A monolayers.

A similar method of preparing, water-soluble nanoparticles of the metals gold, silver, platinum, palladium, cobalt and nickel is descried by Heath at al. in U.S. Pat. No. 6,103,868, herein incorporated by reference.

Other suitable methods for the preparation of coated nanoparticles are known (see for example Chen et al. (*Colloids and Surfaces A* 169:1074116 (2000)); Hagemeyer et al. in U.S. Pat. No. 6,074,979; Wuelfing et al. (*J. Am. Chem. Soc.* 120:12696-12697 (1998)); Chan et al. (Science 281:2016-2018 (1998)); Mitchell et al. (*J. Am. Chem. Soc.* 121:8122-8123 (1999)); and Napper (*J. Colloid. Interface. Sci* 58:390-407 (1977)).

It may be useful to provide a coated nanoparticle where one component of the coating provides a point of attachment for the nucleic acid, and the other component acts as a shield against non-specific binding of, for example, identical nanoparticles which comprise the same nucleic acid and hence are not designed to bind to one another.

The first nucleic add of the present disclosure may have a $T_m$, when hybridised to the second nucleic add sequence, of at least about 45° C., typically between about 50° to 60° C., although the $T_m$ may be higher, e.g., 65° C., 75° C. or 85° C. at a pressure of 1 bar.

In one embodiment, the first nucleic add sequence of the invention is designed to hybridise to the second nucleic add sequence under physiological conditions, with a $T_m$ substantially greater than 37° C. e.g., at least 45° C. and, in some aspects approximately 60° C.-80° C. In a preferred aspect the first nucleic acid sequence is 100% complementary to the second nucleic add sequence, or it may include one or more mismatches. Methods are provided in which the first nucleic add is generally greater than 99%, greater than 95% complementary to the second nucleic add sequence, greater than 90% complementary, greater than 80% complementary, or greater than 75% complementary to the second nucleic add sequence. In one embodiment the first nucleic add is a polyA molecule (polyA being a nucleic add chain formed from identical adenine molecules) and the second nucleic add is a polyT molecule (polyT being a nucleic add chain formed from identical thymine molecules). PolyA and polyT molecules will bind to each other under degrees of high stringency due to the exact complementarity of the sequences to bind to each other. Alternatively the first nucleic add may be polyC molecule (a chain of cytosine molecules) and the second nucleic add a polyG molecule (a chain of guanine molecules) as such molecules will also bind to each other under high stringency due to complementary base pairing of G to C. The skilled addressee is well versed in how to provide different nucleic add molecules which are capable of binding to one another and hence there is no restriction to the sequences which may be employed in the present invention, rather that they should be capable of binding or hybridising to one another preferably under conditions appropriate to the present invention and typically under high stringency conditions known in the art.

Also, as described in U.S. Patent Publication No 2003/0147966, nanoparticles of the invention include those that are available commercially, as well as those that are synthesized, e.g., produced from progressive nucleation in solution (e.g., by colloid reaction) or by various physical and chemical vapour deposition processes, such as sputter deposition. See, e.g., HaVashi, Vac. Sci. Technol. A5(4): 1375-84 (1987); Hayashi, Physics Today, 44-60 (1987); MRS Bulletin, January 1990, 16-47. As further described in U.S. Patent Publication No. 2003/0147966, nanoparticles contemplated are alternatively produced using a metal salt and a citrate-reducing agent, using methods known in the art. See, e.g., Marinakos at al, Adv. Mater. 1 1:34-37 (1999); Marinakos et al., Chem. Mater. 10: 1214-19 (1998); Enustun & Turkevich, J. Am. Chem. Soc. 85: 3317 (1963).

Nanoparticles provided that are functionalised with a polynucleotide, or a modified form thereof, generally comprise a polynucleotide from about 5 nucleotides to about 1000 nucleotides in length. More specifically, nanoparticles are functionalised with polynucleotides that are about 10 to about 500 nucleotides in particular 15 to 200 nucleotides in length.

As discussed above, modified nucleic acid molecules are contemplated for functionalizing nanoparticles. In various aspects, a nucleic acid molecule functionalised on a nanoparticle is completely modified or partially modified. Thus, in various aspects, one or more, or all, sugar and/or one or more or all internucleotide linkages of the nucleotide units in the polynucleotide may be replaced with "non-naturally occurring" groups.

In one aspect, this embodiment contemplates a peptide nucleic acid (PNA). In PNA compounds, the sugar-backbone of a polynucleotide is replaced with an amide containing backbone. See, for example U.S. Pat. Nos. 5,539,082; 5,714,331; and 5,719,262, and Nielsen et al., Science, 1991, 254, 1497-1500 the disclosures of which are herein incorporated by reference.

Other linkages between nucleotides and unnatural nucleotides contemplated for the disclosed polynucleotides include those described in U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; 5,792,747; and 5,700,920; U.S. Patent Publication No. 20040219565; International Patent Publication Nos. WO 98/39352 and WO 99/14226; Mesmaeker et. al., Current Opinion in Structural Biology 5:343-388 (1995) and Susan M. Freier and Karl-Heinz Altmann, Nucleic Acids Research, 25:4429-4443 (1997), the disclosures of which are incorporated herein by reference. Specific examples of oligonucleotides include those containing modified backbones or non-natural internucleoside linkages. Oligonucleotides having modified backbones include those that retain a phosphorus atom in the backbone and those that do not have a phosphorus atom in the backbone. Modified oligonucleotides that do not have a phosphorus atom in their internucleoside backbone are considered to be within the meaning of "oligonucleotide."

Modified polynucleotides may also contain one or more substituted sugar moieties. In certain aspects, polynucleotides comprise one of the following at the 2' position: OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted $C_i$ to $C_{jo}$ alkyl or $C_2$ to $C_{io}$ alkenyl and alkynyl. Other embodiments include $O[(CH_2)_nO]_mCH_3$, $O(CH2)_nOCH_3$, $O(CH_2)_nNH_2$, $O(CH_2)_nCH_3$, $O(CH_2)_nONH_2$, and $O(CH_2)_nON[(CH_2)_nCH_3]_2$, where n and m are from 1 to about 10. Other polynucleotides comprise one of the following at the 2' position: CI to CIO lower alkyl, substituted lower alkyl, alkenyl, alkynyl, alkaryl, aralkyl, O-alkaryl or O-aralkyl, $SH$, $SCH_3$, $OCN$, $Cl$, $Br$, $ON$, $CF_3$, $OCF_3$, $SOCH_3$, $SO_2CH_3$, $ONO_2$, $NO_2$, $N_3$, $NH_2$, heterocycloalkyl, heterocycloalkaryl, aminoalkylamino, polyalkylamino, substituted silyl, an RNA cleaving group, a reporter group, an intercalator, an group for improving the pharmacokinetic properties of a polynucleotide, or a group for improving the pharmacodynamic properties of a polynucleotide, and other substituents having similar properties. In one aspect, a modification includes T-methoxyethoxy (2'-0-$CH_2CH_2OCH_3$, also known as 2'-O-(2-methoxyethyl) or 2'-MOE) (Martin at al, 1995, Helv. Chim. Acta, 78: 486-504) i.e. an alkoxyalkoxy group. Other modifications include 2'-dimethylaminooxyethoxy, group, also known as 2'-DMAOE, and 2'-dimethylaminoethoxyethoxy (also known in the art as 2'-O-dimethylamino-ethoxy-ethyl or 2'-DMAEOE).

Still other modifications include 2'-methoxy (2'-0-$CH_3$), 2'-aminopropoxy (T-O$CH_2CH_2CH_2NH_2$), 2'-allyl (2'-$CH_2$—$CH$═$CH_2$), 2'-0-allyl (2'-0-$CH_2$—$CH$═$CH_2$) and T-fluoro (2'-F). The 2'-modification may be in the arabino (up) position or ribo (down) position. In one aspect, a 2'-arabino modification is Z-F. Similar modifications may also be made at other positions on the polynucleotide, for example, at the 3' position of the sugar on the 3' terminal nucleotide or in 2'-5' linked polynucleotides and the 5' position of 5' terminal nucleotide. Polynucleotides may also have sugar mimetics such as cyclobutyl moieties in place of the pentofuranosyl sugar. See, for example, U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; 5,792,747; and 5,700,920, the disclosures of which are incorporated by reference in theft entireties herein.

In one aspect, a modification of the sugar includes Locked Nucleic Adds (LNAs) in which the Z-hydroxyl group is linked to the 3 or 4' carbon atom of the sugar ring, thereby forming a bicyclic sugar moiety. The linkage is in certain aspects a methylene (—$CH_2$—)n group bridging the 2' oxygen atom and the 4' carbon atom wherein n is 1 or 2. LNAs and preparation thereof are described in WO 98/39352 and WO 99/14226, the disclosures of which are incorporated herein by reference.

A surface density adequate to make the nanoparticles stable and the conditions necessary to obtain it for a desired combination of nanoparticles and polynucleotides can be determined empirically. Generally, a surface density of at least 2 pmoles/cm$^2$ will be adequate to provide stable nanoparticle-oligonucleotide compositions. In some aspects, the surface density is at least 15 pmoles/cm$^2$. Methods are also provided wherein the polynucleotide is bound to the nanoparticle at a surface density of at least 2 pmol/cm", at least 4 pmol/cm, at least 8 pmol/cm$^2$, at least 9 pmol/cm$^2$, at least 10 pmol/cm$^2$, at least about 25 pmol/cm$^2$, at least about 50 pmol/cm$^2$, at least about 75 pmol/cm$^2$, at least about 100 pmol/cm$^2$, at least about 150 pmol/cm$^2$, at least about 200 pmol/cm$^2$, at least about 400 pmol/cm$^2$, at least about 1000 pmol/cm$^2$ or more.

Nucleic add molecules contemplated for use in the methods described herein include those bound to the nanoparticle through any means. Regardless of the means by which the nucleic add molecule is attached to the nanoparticle, attachment in various aspects is effected through a 5' linkage, a 3' linkage, some type of internal linkage, or any combination of these attachments.

Methods of attachment are known to those of ordinary skill in the art and are described in for example US Publication No. 2009/0209629, which is incorporated by reference herein in its entirety. Methods of attaching RNA to a nanoparticle are generally described in PCT/US2009/65822, which is incorporated by reference herein in its entirety. Accordingly, in some embodiments, the disclosure contemplates that a polynucleotide attached to a nanoparticle is RNA.

In certain aspects, functionalised nanoparticles are contemplated which include those wherein a nucleic add molecule is attached to the nanoparticle through a spacer. "Spacer" as used herein means a moiety that does not participate in inter nucleic add binding per se but which serves to increase distance between the nanoparticle and the functional nucleic acid molecule, or to increase distance between individual nucleic acid molecules when attached to the nanoparticle in multiple copies. Thus, spacers are contemplated being located between individual nucleic acid molecules in tandem, whether the nucleic acid molecules have the same sequence or have different sequences.

In one aspect, the spacer when present is an organic moiety. In another aspect, the spacer is a polymer, including but not limited to a water-soluble polymer, a nucleic acid, a polypeptide, an oligosaccharide, a carbohydrate, a lipid, an ethylglycol, or combinations thereof.

In certain aspects, the spacer is a polynucleotide which it is covalently bound to the nanoparticles. These "spacer" polynucleotides are the same polynucleotides as described above. As a result of the binding of the spacer to the nanoparticles, the first/second polynucleotide is spaced away from the surface of the nanoparticles and is more accessible for hybridisation with its respective second/first nucleic acid. In instances wherein the spacer is a polynucleotide, the length of the spacer in various embodiments at least about 10 nucleotides, 10-30 nucleotides, or even greater than 30 nucleotides. The spacer may have any sequence which does not interfere with the ability of the first/second polynucleotide to become bound to the nanoparticles or to its binding to a complementary molecule. Typically the spacers should not have sequences complementary to each other or to that of the first nucleotide, but may be ail or in part complementary to the second polynucleotide.

According to a second aspect of the present invention there is provided a method for recovering hydrocarbons from a formation, comprising:

providing a first fluid comprising a first nucleic acid molecule, to a first permeable region of the formation from a first location near or and/or adjacent the first region, providing a second fluid comprising a second nucleic acid molecule to the first permeable region from the first location and/or a second location near and/or adjacent the first region, and allowing the first and second fluids to contact to allow the first and second nucleic acid molecules to hybridise or otherwise bind to one another to form a complex capable of reducing the permeability in at least a portion of the first region; and providing a displacement substance in the formation to displace hydrocarbons from the formation.

The method may comprise injecting a flood fluid, such as water, in the formation, to displace hydrocarbons from the formation.

The method may comprise injecting the first fluid from at least one first wellbore, e.g. production wellbore.

The method may comprise injecting the second fluid from at least one first wellbore and/or at least one second wellbore, e.g. injection wellbore.

The method may comprise recovering hydrocarbons from at least one first wellbore, e.g. production wellbore.

The features described in relation to any other aspect or the invention, can apply in respect of the method according to a second aspect of the present invention, and are therefore not repeated here for brevity.

Figure 2:
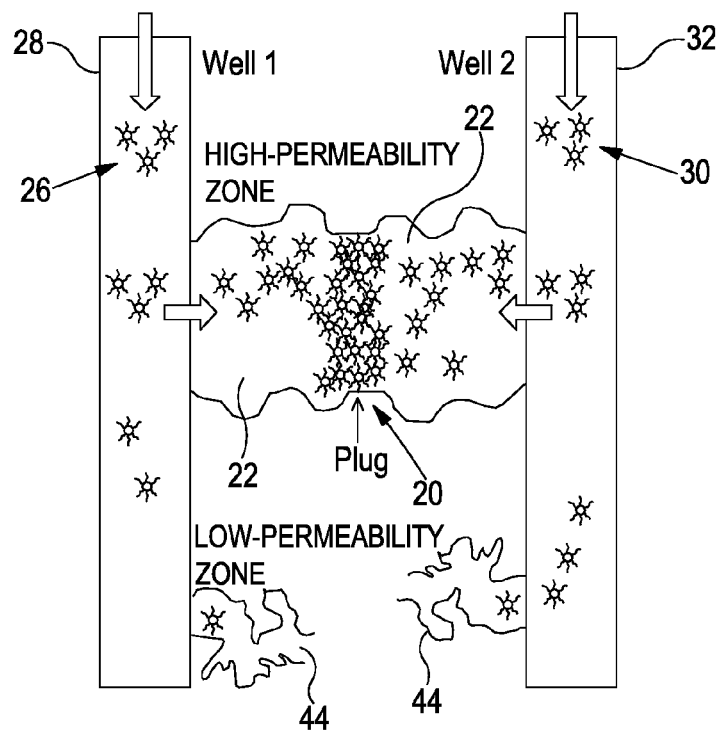

The present invention will now be further described by way of example and with reference to the figures which show:

FIG. 1 shows a schematic representation of complex formation occurring between two different types of nucleic acid functionalised nanoparticles which are designed to bind to each other; and FIG. 2 shows a representation of complex formation in an area of high permeability substrate following introduction of first and second conformation controlling fluids from separate wells adjacent to the high permeability area.

Heterogeneity in oil reservoirs remains a great challenge for the oil industry in terms of oil recovery related to macroscopic displacement issues. For example very-high-permeability zones may be present due to the sedimentation history of minerals from which the reservoir is made of. In the Middle East, for example, zones of reservoirs originating from high-energy zones, such as coral reefs, may be highly permeable due to certain geological formations. Hence these zones will lead to bypassing of low-permeability pore networks during water or chemical flooding and will result in low and inefficient macroscopic displacement. The present invention may find particular application in such areas The present invention serves to avoid this bypassing by selectively plugging these high-permeability zones hence diverting the flow path of the flood towards low-permeability zones.

This is achieved by way of employing two separate nucleic acid molecules to a region of high permeability, which are designed to hybridise to one another. Each nucleic acid molecule is bound to a nanoparticle and hybridisation of the nucleic acid molecules leads to the formation of a complex which is designed to act as a plug and reduce or eliminate flow of a flood fluid through the region of high permeability.

Nanoparticles with a given type of poly-nucleotide strand will not aggregate with nanoparticles of the same type (due to incompatible bases preventing base-pair interaction) and hence plugging is efficiently avoided when nanoparticles with only one type of polynucleotide sequence is present, such as in the near well bore regions. Moreover, the particles will not adsorb to oil-wet rock material due to the hydrophilic nature of the DNA strands. Due to the presence of high permeability zones the nanoparticles will prefentially be directed to these areas and when for example polyA- and polyT nanoparticles meet in these areas, optionally in a high salt concentration (charge shielding the negative phosphate groups of DNA) will result in very strong A-T recognition and binding (essentially a salting-out effect, i.e. solvation power of water is highly reduced and base-pair interactions will circumvent solvation effects). The hybridization of polyA and polyT strand will lead to assembly of nanoparticles in a DNA-hybridization-directed complex with high mechanical strength due to the DNA-DNA interaction enhanced by high salt concentration. This is represented schematically in FIG. 1.

FIG. 1 show what happens when nanoparticles (10) which are functionalised with poly-A oligonucleotides are allowed to come in to contact with nanoparticles (12) which are functionalised with poly-T oligonucleotides. The two types of nanoparticles (10, 12) are able to hybridise to one another through to complementary base pairing in order to form a complex (14). Due to the fact that each nanoparticle (10, 12) comprises a plurality of oligonucleotides bound to the surface of the nanoparticle (10, 12), a large complex (16) is capable of being formed which comprises many nanoparticles (10, 12).

An example of how this would work in practice is shown schematically in FIG. 2 for example, which shows how plug (20) formation occurs in the area of high permeability (22). A conformation controlling fluid which comprises functionalised nanoparticles (26), which comprise a first nucleic acid molecule, are provided to a first well (28) and the fluid and nanoparticles enter the area of high permeability (22), where the nanoparticles (26) form the first conformation controlling fluid are able to come into contact with functionalised nanoparticles (30), which comprise a second nucleic acid molecule, complementary to the first nucleic acid. The functionalised nanoparticles (30), which comprise the second nucleic acid molecule have been provided to the area of high permeability from a second well (32) adjacent to the area of high permeability, but away from the first well (28).

Mixing may be promoted as follows: A first conformance controlling fluid containing the first type of the nanoparticles (26) can be designed to be much less viscous than the second conformance controlling fluid containing the second type of nanoparticles (30), the latter solution containing e.g. a polymer. Hence the fluid containing the first type of nanoparticle (26) will create viscous fingering through the other nanoparticle (30) containing fluid rather than displace the solution containing the other type of nanoparticles in a piston-like fashion.

Once the first and second complementary nucleic acid molecules contact each other, they are able to hybridise to one another, thereby forming a complex which may be comprised of many functionalised nanoparticles (26, 30) due to each nanoparticle comprising a plurality of nucleic acid molecules being bound to the surface of the nanoparticle. The formation of the complex leads to a plug (20) being formed in the area of high permeability. However, the nanoparticles (26, 30) provided from the first and second wells are not expected to come into substantial contact within an area of low permeability (44), or will do so at a much reduced frequency and so complex formation and hence plug formation is not expected to occur in the area of low permeability (44).

Plugging in small pores is not expected to be a significant problem. Once the nanoparticles (26, 30) have had time to mix, the complementary nucleic acid molecules will hybridise to one another and plug up the areas where they have mixed, primarily in the high-permeability zones (22). If the two types of nanoparticles (26, 30) have been pumped from opposite sides of the zone of permeability, the risk that they will react in the near well-bore matrix is minimal. It is of course necessary to displace both types of nanoparticles (26, 30) from the wellbore with properly sized slugs. The probability of two non-already-in-place components to meet in a low-permeability zone (44) when injected from two different wells (28, 32) will be very low. However, if plugging in low-permeability zones should occur these can easily be removed by injection of alkaline water, for example, in order to disrupt the bonds formed between the complementary base pairing.

When a stable plug has been established in the high-permeability zone (22), the water flood or chemical flood can be injected and the flood flow paths will be diverted towards initial low-permeability zones (44). Since surfactants and polymers commonly used for enhanced oil recovery purposes do not have the ability to participate in Hydrogen-bonding, these are not expected to disrupt DNA-DNA interactions. Moreover, DNA-duplexes will be stable when alcohol is present (due to the salting out effect as well) so co-solvents can be included in the chemical flood.

In accordance with a specific embodiment of the invention the first and second nucleic acids may be PolyA and polyT respectively and these may be provided from two different wells (28, 32) to avoid in-well and near well-bore plugging resulting from nonpreferable DNA-directed nanoparticle assembly.

After the plug (20) has formed it can become permanent through use of cross-linking agents for example, or it can be removed in a controlled manner such as by using a denaturing agent known in the art.

The invention claimed is:

1. A method of selectively reducing a permeability of a first permeable region of a subterranean formation, the method comprising:
   providing first and second conformance controlling fluids to the first permeable region,
   wherein the first conformance controlling fluid comprises a first nucleic acid molecule and the second conformance controlling fluid comprises a second nucleic acid molecule, and
   wherein said first and second nucleic acid molecules hybridise to one another such that a nucleic acid complex is formed and configured to reduce the permeability in at least a portion of the first permeable region.

2. The method according to claim 1, further comprising:
   providing a displacement or flood fluid to the subterranean formation after the nucleic acid complex has been formed, whereby the displacement or flood fluid is directed to regions of the subterranean formation in which a reduction in permeability has not occurred through complex formation.

3. The method according to claim 1, wherein the first and second conformance controlling fluids are provided to the first permeable region separately, such that the first and second conformance fluids only contact one another once within the first permeable region.

4. The method according to claim 3, wherein the first and second conformance controlling fluids are provided from first and second wellbores situated on either side or adjacent to the first permeable region.

5. The method according to claim 1, further comprising: providing a salt to facilitate hybridisation of the first and second nucleic acid molecules.

6. The method according to claim 5, wherein the salt is present in an amount of between 0.01 to 0.3M in the first permeable region.

7. The method according to claim 5, wherein the salt is present in one or both of the first and second conformance controlling fluids.

8. The method according to claim 5, wherein the salt is NaCl.

9. The method according to claim 1, further comprising: providing a nucleic acid cross-linking agent to the first permeable region in order to stabilise any complexes formed therein.

10. The method according to claim 9, wherein the nucleic acid cross-linking agent is an alkylating agent, or an aldehyde.

11. The method according to claim 10, wherein the alkylating agent is 1,3-bis(2-chloroethyl)-1-nitrosourea (BCNU), and the aldehyde is acrolein or crotonaldehyde.

12. The method according to claim 1, further comprising: providing a denaturing agent, the denaturing agent including urea or formamide, or increasing pH by providing a base to a second permeable region of lower permeability in order to reduce any complexes formed therein.

13. The method according to claim 1, wherein the first and second conformance controlling fluids are of different viscosities to encourage mixing of the first and second conformance controlling fluids.

14. The method according to claim 1, wherein the providing includes injecting the first conformance controlling fluid and the second conformance controlling fluid simultaneously or substantially simultaneously.

15. The method according to claim 1, wherein the method comprises measuring or monitoring pressure in the first permeable region or a first wellbore or in a second permeable region or second wellbore.

16. The method according to claim 1, wherein the first and second nucleic acid molecules are provided as nanoparticles functionalised with said first and second nucleic acid molecules respectively.

17. The method according to claim 16, wherein each nanoparticle comprises a plurality of said first or second nucleic acid molecules respectively.

18. The method according to claim 1, wherein the first nucleic acid molecule is greater than 75% complementary to the second nucleic acid molecule.

19. The method according to claim 1, wherein the first nucleic acid molecule is a polyA molecule and the second nucleic acid molecule is a polyT molecule, or the first nucleic acid molecule is a polyC molecule and the second nucleic acid molecule is a polyG molecule.

20. A method for recovering hydrocarbons from a formation, comprising:
providing a first fluid comprising a first nucleic acid molecule to a first permeable region of the formation from a first location near or adjacent the first permeable region;
providing a second fluid comprising a second nucleic acid molecule to the first permeable region from the first or from a second location near or adjacent the first permeable region;
allowing the first and second fluids to contact within the first permeable region to allow the first and second nucleic acid molecules to hybridise to one another to form a complex configured to reduce a permeability in at least a portion of the first permeable region; and
providing a displacement substance in the formation to displace hydrocarbons from the formation.

21. The method according to claim 20, further comprising:
injecting a flood fluid into the formation in order to displace hydrocarbons from the formation.

22. The method according to claim 20, further comprising:
recovering said hydrocarbons from at least one first wellbore.

* * * * *